United States Patent
Picucci

(10) Patent No.: US 9,294,805 B2
(45) Date of Patent: *Mar. 22, 2016

(54) APPARATUS AND METHOD FOR PROVIDING MEDIA CONTENT

(71) Applicant: AT&T Intellectual Property I, LP, Atlanta, GA (US)

(72) Inventor: Joseph Picucci, Pittsburg, CA (US)

(73) Assignee: AT&T INTELLECTUAL PROPERTY I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/662,831

(22) Filed: Mar. 19, 2015

(65) Prior Publication Data

US 2015/0195609 A1    Jul. 9, 2015

Related U.S. Application Data

(63) Continuation of application No. 12/574,210, filed on Oct. 6, 2009, now Pat. No. 9,021,542.

(51) Int. Cl.
| | |
|---|---|
| *H04N 21/432* | (2011.01) |
| *H04N 5/76* | (2006.01) |
| *H04N 21/472* | (2011.01) |
| *H04N 21/63* | (2011.01) |
| *H04N 21/845* | (2011.01) |
| *H04N 21/41* | (2011.01) |
| *H04N 21/437* | (2011.01) |
| *H04N 21/442* | (2011.01) |
| *H04N 21/45* | (2011.01) |
| *H04N 5/765* | (2006.01) |
| *H04N 5/782* | (2006.01) |

(52) U.S. Cl.
CPC ........... *H04N 21/4325* (2013.01); *H04N 5/76* (2013.01); *H04N 21/4135* (2013.01); *H04N 21/437* (2013.01); *H04N 21/44204* (2013.01); *H04N 21/4532* (2013.01); *H04N 21/47202* (2013.01); *H04N 21/47217* (2013.01); *H04N 21/632* (2013.01); *H04N 21/8456* (2013.01); *H04N 5/765* (2013.01); *H04N 5/782* (2013.01)

(58) Field of Classification Search
None
See application file for complete search history.

(56) References Cited

U.S. PATENT DOCUMENTS

| | | |
|---|---|---|
| 2004/0010588 A1 | 1/2004 | Slater |
| 2004/0148599 A1 | 7/2004 | Kamalanathan et al. |
| 2009/0300673 A1 | 12/2009 | Bachet et al. |

*Primary Examiner* — Mark D Featherstone
(74) *Attorney, Agent, or Firm* — Guntin & Gust, PLC; Joseph Hrutka

(57) ABSTRACT

A system that incorporates teachings of the present disclosure may include, for example, a set-top box having a controller to receive a selection of media content that has finished being broadcast where the selection is of the previously broadcast media content, transmit a request for the media content, and receive the media content for presentation at the display device, where the media content includes a plurality of segments, where one or more of the segments is provided by each of a plurality of digital video recorders (DVR's) that have recorded the media content, where the DVR's are remote from the set-top box, and where the plurality of segments are merged prior to presentation by the set-top box. Other embodiments are disclosed.

20 Claims, 5 Drawing Sheets

400

APPARATUS AND METHOD FOR PROVIDING MEDIA CONTENT

CROSS-REFERENCE TO RELATED APPLICATION(S)

This application is a continuation of and claims priority to U.S. patent application Ser. No. 12/574,210 filed Oct. 6, 2009 by Joseph Picucci, entitled "Apparatus and Method for Providing Media Content." All sections of the aforementioned application(s) are incorporated herein by reference in its entirety.

FIELD OF THE DISCLOSURE

The present disclosure relates generally to communication systems and more specifically to an apparatus and method for providing media content.

BACKGROUND

Service providers broadcast media content to users according to schedules, such as shown in an Electronic Program Guide (EPG). The Service Providers can also provide access to select media content for downloading through video on demand (VOD).

BRIEF DESCRIPTION OF THE DRAWINGS

Reference will now be made to the accompanying drawings, which are not necessarily drawn to scale, and wherein.

DETAILED DESCRIPTION

One embodiment of the present disclosure can entail a computer-readable storage medium comprising computer instructions to receive a request from a set top box for media content that has finished being broadcast, determine a plurality of digital video recorders (DVR's) that have recorded the media content where the DVR's are remote from the set top box, designate segments for the media content, receive one or more of the segments from each of the DVR's, merge the received segments, and transmit the merged segments to the set top box for presentation of the media content.

Another embodiment of the present disclosure can entail a set top box having a controller to present an Electronic Programming Guide (EPG) at a display device that includes previously broadcast media content, receive a selection of media content using the EPG where the media content has finished being broadcast and where the selection is of the previously broadcast media content, transmit a request for the media content, and receive the media content for presentation at the display device, where the media content comprises a plurality of segments, where one or more of the segments is provided by each of a plurality of digital video recorders (DVR's) that have recorded the media content, where the DVR's are remote from the set top box, and where the plurality of segments are merged prior to presentation by the set top box.

Yet another embodiment of the present disclosure can entail a method including receiving a request at a server for media content to be delivered to a set top box where the media content has finished being broadcast, determining a plurality of digital video recorders (DVR's) that have recorded the media content where the DVR's are remote from the set top box and where the media content comprises a plurality of segments, receiving one or more of the plurality of segments from each of the DVR's, merge the received segments, and transmit the merged segments from the server to the set top box for presentation of the media content.

Figure 1:
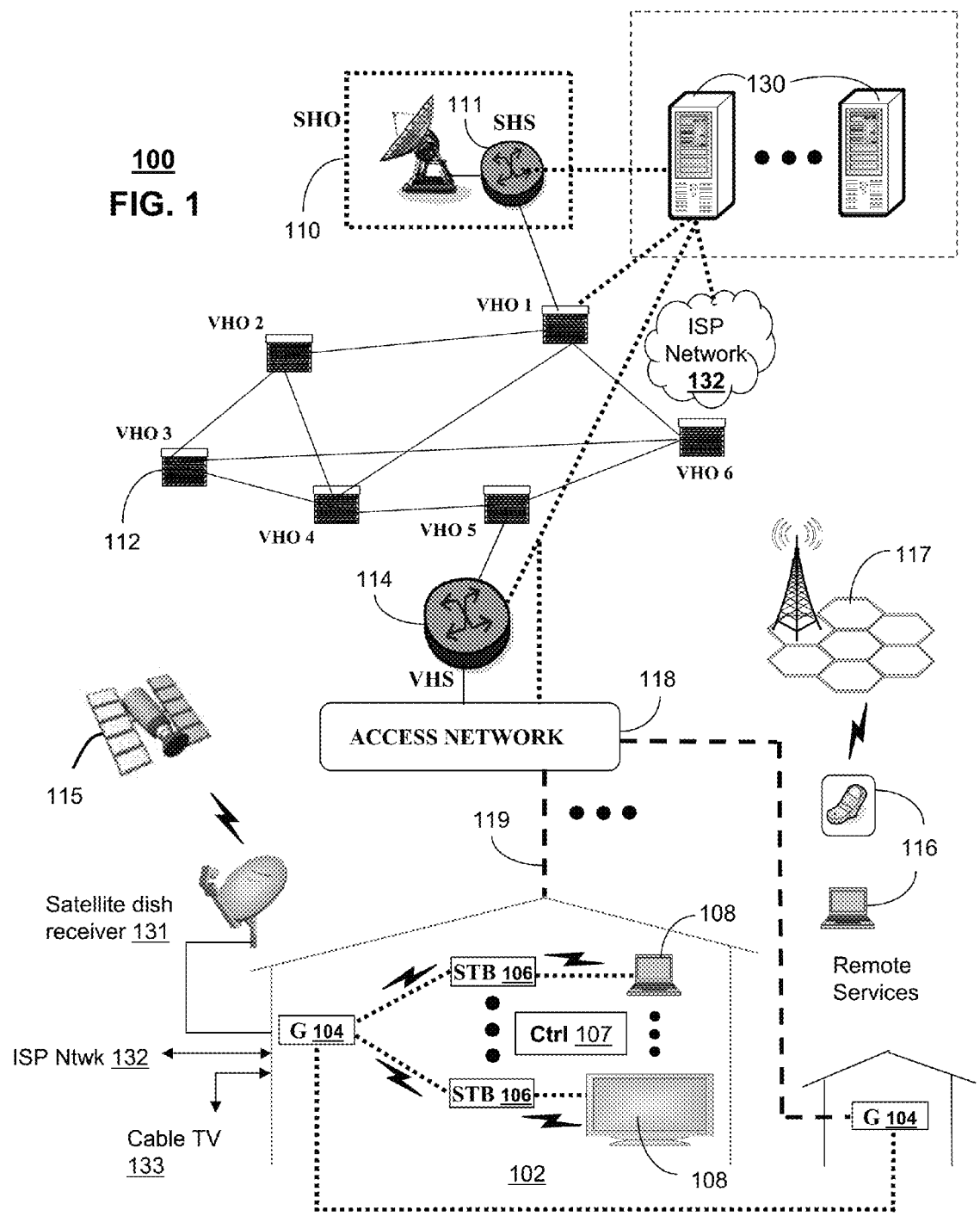
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the servers 130 can provide previously broadcast media content to an STB 106. For example, the servers 130 can poll DVR's or otherwise monitor DVR's throughout the network to determine whether they have recorded the desired media content or a portion thereof. The servers 130 can then obtain selected segments of the media content from the DVR's and merge the segments. The merged segments can be transmitted to the requesting STB, including through use of progressive download while the merging is being performed.

In another embodiment, the network can establish a hierarchy of P2P media content sharing via servers 130. For instance, unique identifiers can be associated with broadcast media content or portions of broadcast media content, which can be monitored by servers 130. A first server 130 can determine if all portions of the media content are available from DVR's associated with the server through use of the identifier. If not, then the server can communicate with second servers that are similarly monitoring for recording of the media content by DVR's associated with the second servers. The servers 130 can be associated with particular DVR's based on geography, service plans or other factors. In one embodiment, a hierarchy of servers 130 can be used to facilitate the communication between the first and second servers, although other configurations can also be utilized. It follows from the above illustrations that the present disclosure can apply to any present or future interactive media content services.

Figure 2:
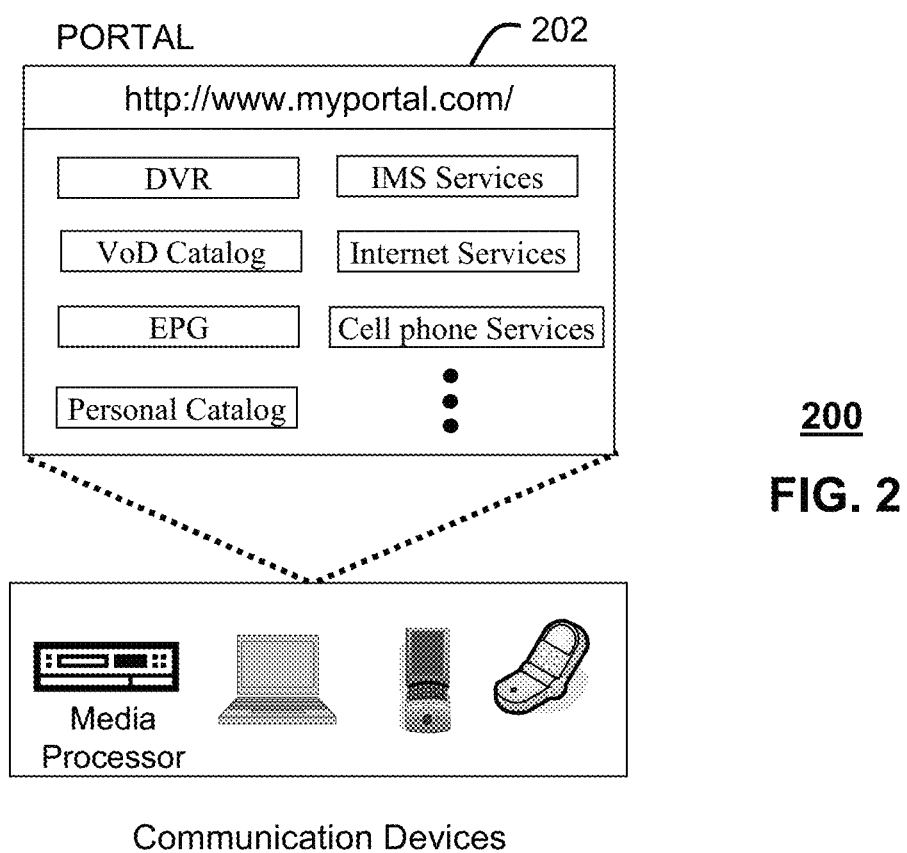
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
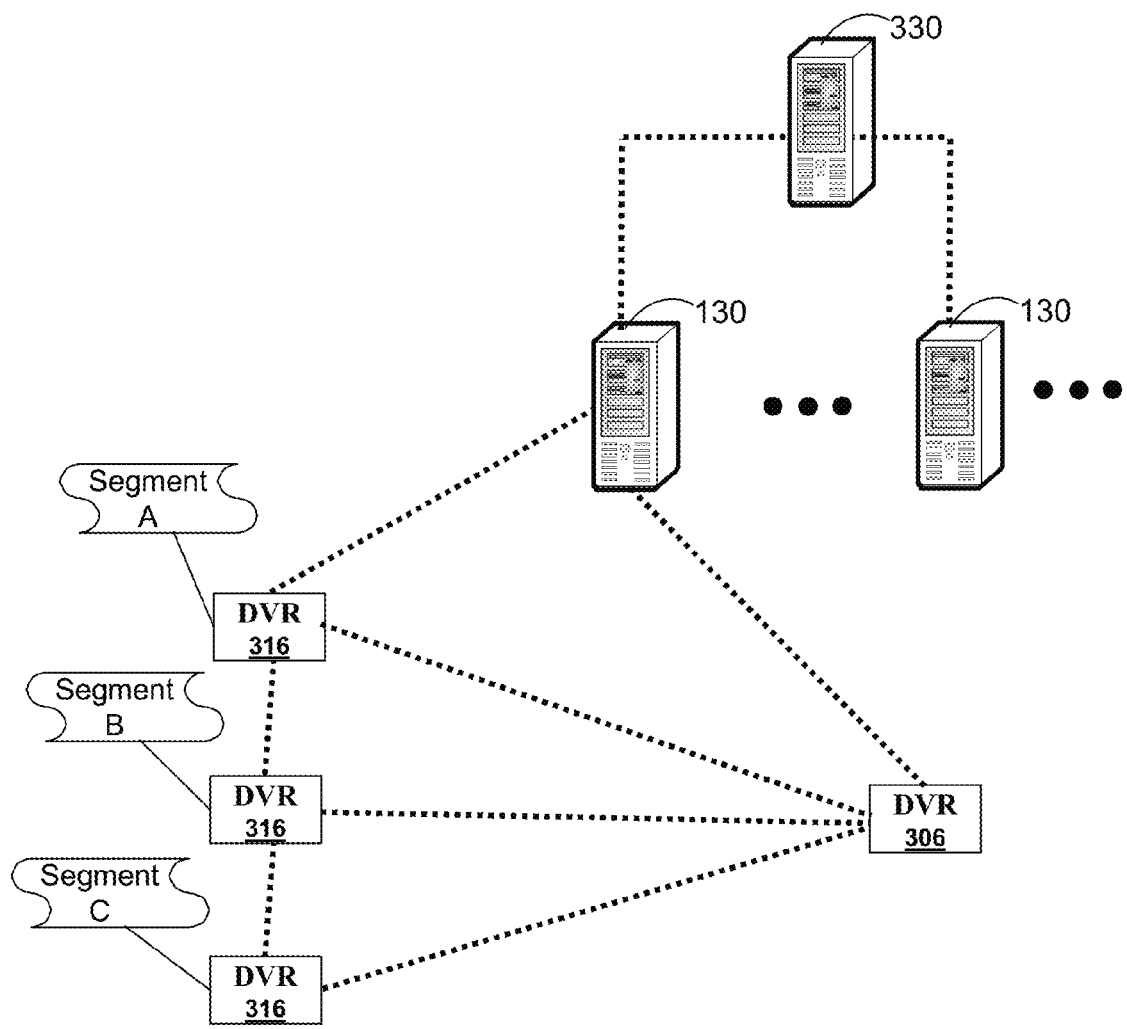
FIG. 3 depicts an illustrative embodiment of a communication system that provides media services.

FIG. 3 depicts an exemplary embodiment of a communication system 300 for delivering media content. Communication system 300 can be overlaid or operably coupled with communication system 100 as another representative embodiment of said communication systems. System 300 can include a plurality of gateways, such as residential gateways 104, which include DVR's 306, 316. The DVR's 306, 316 can be in communication with various network devices, including media delivery server 130, as well as various customer premises equipment for the delivery of voice, video and data services. System 300 can utilize various protocols, techniques and combinations thereof for transmitting the requested media content to the DVR's 306, 316, including WiFi, WiMax, GPRS, 3G, 4G and so forth. System 300 can also utilize various protocols, techniques and combinations thereof for transmitting the requested media content to various points throughout the system, including use of an IPTV access network, the public Internet, and/or an IMS network. Delivery of the services can be to a variety of user end devices, including STB's, TV's, PCs, laptops, PDAs, mobile phones and any other device capable of receiving and presenting media content.

In one embodiment, each of a plurality of servers 130 can be assigned to, or associated with, particular DVR's, such as DVR 306 and DVR's 316. The assignment can be based on a number of factors which includes service plans, geography, history of recording behavior and so forth. For instance, the recording behavior at a particular DVR can be monitored for the type of recordings that are being performed by the user, such as recording of sitcoms. Based on this monitored behavior, the DVR can be assigned to a server that is associated with other DVR's that frequently record sitcoms. Factors such as med content genre, recording times, recording amount and so forth can be utilized in assigning a DVR to a server 130.

The server 130 can retrieve segments A, B, C from DVR's 316, respectively, and merge the segments into the media content to be delivered to the DVR 306. In one embodiment, the server 130 can search a first group of DVR's for the availability of the media content (e.g., having been previously recorded by the user of the DVR). If the media content is unavailable then the server 130 can search other groups of DVR's for the media content. The searching can be performed by the server 130 directly with each of the DVR's and/or can be performed through communication with other servers 130. In one embodiment, servers 330 can be utilized to facilitate communication between the servers 130 so that the media content can be more easily located. For instance, the servers 130 can maintain a database of the servers 130 having DVR's that previously recorded media programming at the time the desired media content was broadcast. The particular DVR's can then be searched, or otherwise communicated with, to determine if the particular media content had been recorded (or whether a different channel at the same time had been recorded).

The exemplary embodiment of system 300 illustrates a centralized search and retrieval of the media content using the server 130. However, the present disclosure contemplates using a distributed methodology as well. For example, the server 130 can search and locate a plurality of servers that have previously recorded the desired media content. The server 130 can then transmit instructions to each of those DVR's for providing a segment of the media content directly to the DVR 306, such as at a pre-determined time. In this example, the STB 106 and/or the gateway 104 associated with the requesting DVR could then combine the segments into a playable media content.

Figure 4:
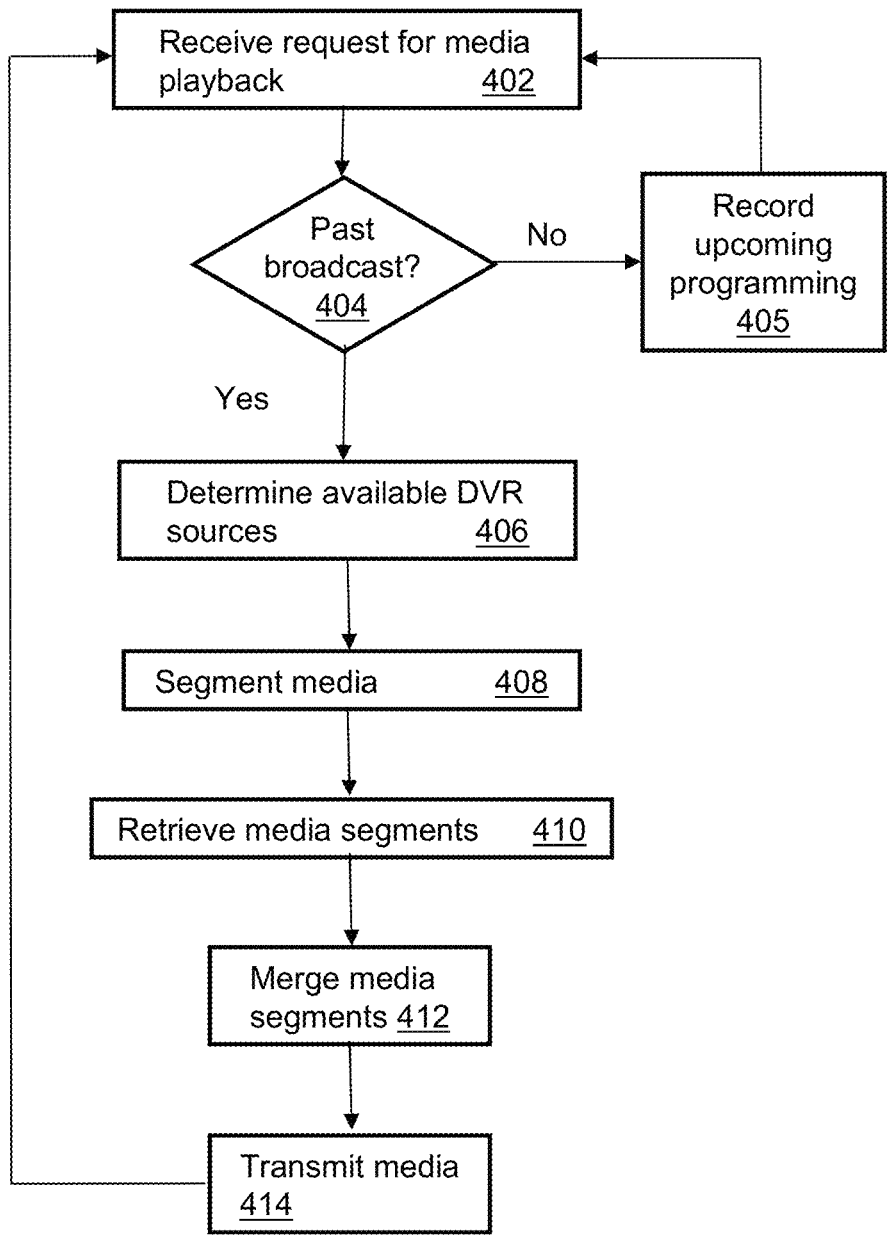
FIG. 4 depicts an illustrative embodiment of a method operating in portions of the communication systems of FIGS. 1 and 3.

FIG. 4 depicts an illustrative method 400 operating in portions of communication systems 100 and 300. Method 400 can begin with step 402 in which a request is made for media content that has been previously recorded. For example, an EPG can provide access to programming going back a particular number of days as well as going forward a particular number of days. The user can then highlight the media content that he or she desires to play (or record). In step 404, the server 130 and/or the STB 106 can determine if the media content is a past broadcast. If the media content is upcoming programming then the DVR can record the programming as it is being broadcast by the STB 106 as in step 405.

If on the other hand the media content has been previously broadcast then the server 130 can determine if there are any DVR's which have recorded the media content or a portion of it as in step 406. The search of DVR's sources can be performed using a number of different techniques. For example, the server 130 can poll a group of DVR's based on an identifier that is associated with the media content.

In one embodiment, the identifier can be an alphanumeric code that includes numbers/letters representative of the channel upon which the show was broadcast and the particular episode of the media content. Other information can be included in the identifier such as the time of broadcast, the subscription plans that would allow viewing of the media content and so forth.

In one embodiment, the identifier can be embedded in, or otherwise provided with, the media content upon initial broadcast so that the media content can then be more easily identified. In another embodiment, a DVR upon recording media content can detect the identifier and communicate the recording event to the server 130. For instance, a first DVR may commence recording of a broadcast football game at the beginning of the game but cease recording at halftime. Based on the identifier, the recording event can be communicated to the server 130 so that the server knows that this particular DVR has half of the football game recorded. A second DVR may commence recording of a broadcast football game at the beginning of the second quarter and cease recording at the end of the game. Based on the identifier, the recording event can be communicated to the server 130 so that the server knows that this particular DVR has three quarters of the football game recorded. The server 130 can then retrieve a first segment from the first DVR which includes the first half of the football game while retrieving a second segment from the second DVR which includes the second half of the football game. In one embodiment, the identifier can also include a segment identifier where the media content is pre-segmented. In this example, retrieval of the various segments can be done by searching available DVR's that have the required segment.

In one embodiment, the search for DVR's having the media content or a portion of it can be performed using historical information associated with the DVR's. For example, recording habits of the DVR's can be monitored, such as for media content type, recording time, recording frequency and so forth. Based on the historical information, select DVR's can first be searched based on a determined probability that those DVR's have recorded the media content. If the media content is not located on those select DVR's then other DVR's having a lower probability can be searched for the media content.

In step 408, the media content can be segmented for retrieval. In one embodiment, the segmenting can be performed prior to the request for playback of the media content, such as at the time of the initial broadcast. In another embodiment, the segmenting can be performed by the server 130 based on a number of factors, such as the number of available DVR sources, the size of the media content, network/CPE resources and so forth. For example, a server 130 can receive a request for playback of a previously broadcast football game which has been recorded on one hundred DVR's (as determined during the search of step 406). If the request is being made during a time period of heavy network traffic then the server can segment the media content into a higher number of segments that can be transmitted to the server 130 from a larger number of DVR's which are distributed throughout the network. In this example, the server 130 can distribute the load across a greater portion of the network by using a larger number of segments as opposed to utilizing two segments coming from only two DVR's. Other factors, including reducing the processing load on the DVR's, can also be utilized in determining the segments for the media content. In one embodiment, Background Intelligence Transfer protocol can be utilized for retrieving the segments from the DVR's.

The server 130 can then retrieve the segments of the media content from the various DVR's in step 410. The segments can be transmitted to the server 130 at or about the same time or at different times, including in series per an instruction provided by the server. In step 412, the server 130 can combine the segments into the media content that is to be delivered to the requesting DVR. The combining of the segments can be performed by the server 130 after all segments have been received, but can also be performed as the segments are being received at the server. In step 414, the server 130 can transmit the media content to the DVR. The transmitting of the media content can commence after the entire media content has been merged together from the segments, but can also be performed while the merging of the segments is being performed by the server 130.

Upon reviewing the aforementioned embodiments, it would be evident to an artisan with ordinary skill in the art that said embodiments can be modified, reduced, or enhanced without departing from the scope and spirit of the claims described below. For example, one or more of determining available DVR sources, segmenting the media content, retrieving the media content and/or merging the media content can be performed by devices other than the server 130, including by the requesting STB/DVR, by the residential gateway associated with the STB/DVR, and by one of the DVR's that has already recorded the previously broadcast media content. For example, an STB can poll a group of other STB's to determine the contents of their corresponding DVR's. If the desired media content is available on the DVR's then the STB can transmit instructions, with the segments assigned, to each of the DVR's to obtain the segments of the media content. The STB can then merge the segments so that the DVR can record the entire media content.

Other suitable modifications can be applied to the present disclosure without departing from the scope of the claims below. Accordingly, the reader is directed to the claims section for a fuller understanding of the breadth and scope of the present disclosure.

Figure 5:
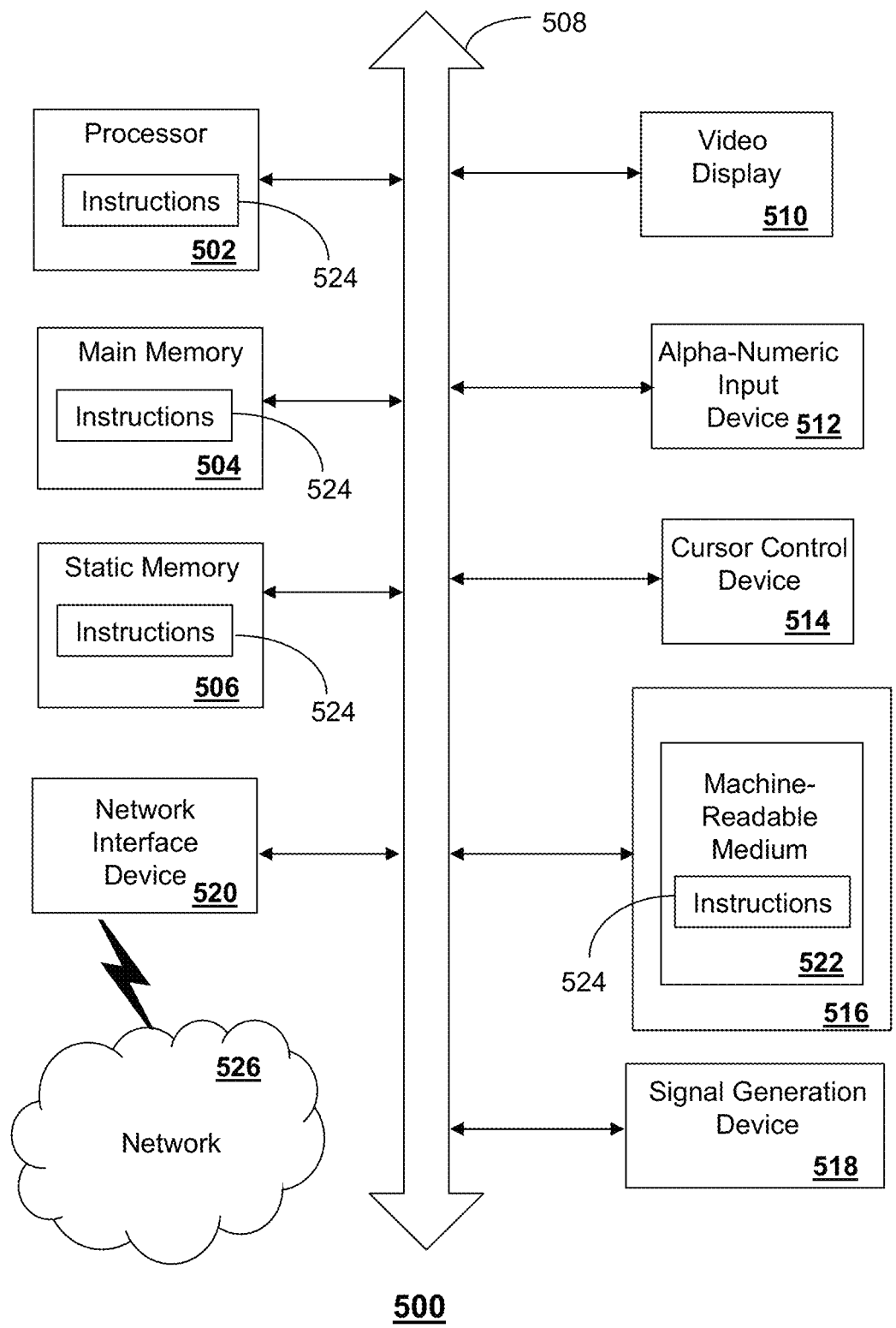
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions that, when executed by a processor, facilitate performance of operations, comprising:
   receiving a request from a media processor for media content that has finished being broadcast;

monitoring historical information associated with a group of digital video recorders;

selecting a plurality of digital video recorders from the group of digital video recorders as a selected plurality of digital video recorders based on the historical information comprising a similar viewing history as a viewing history of a first digital video recorder;

determining a second plurality of second digital video recorders from the selected plurality of digital video recorders that have recorded the media content, the second digital video recorders being remote from the media processor and wherein a number of the second digital video recorders are selected based on network traffic conditions;

receiving segments from the first digital recorder and each of the digital video recorders as received segments;

merging the received segments according to a first segment identifier embedded in the media content as merged segments; and transmitting the merged segments to the media processor for presentation of the media content.

2. The non-transitory, machine-readable storage device of claim 1, wherein the receiving the request for the media content is based on a selection made using an electronic programming guide that includes previously broadcast media content that is currently unavailable by broadcast.

3. The non-transitory, machine-readable storage device of claim 1, wherein the selecting the plurality of digital video recorders is further based on the historical information comprising a time period of heavy network traffic.

4. The non-transitory, machine-readable storage device of claim 1, wherein the operations further comprise designating the segments after receipt of the request for the media content.

5. The non-transitory, machine-readable storage device of claim 1, wherein the operations further comprise designating the segments based on a load associated with one of the network and customer premises equipment.

6. The non-transitory, machine-readable storage device of claim 3, wherein the historical information comprises a type of media content recorded.

7. A media processor, comprising:
a controller; and
a memory that stores executable instructions that, when executed by the controller, facilitate performance of operations, comprising:

presenting an electronic programming guide at a display device, the electronic programming guide including previously broadcast media content;

receiving a selection of media content using the electronic programming guide, the media content having finished being broadcast, the selection being of the previously broadcast media content;

transmitting a request for the media content;

selecting a plurality of digital video recorders as a selected group of digital video recorders from a group of digital video recorders, wherein the plurality of digital video recorders comprises a local digital video recorder and remote digital video recorders, wherein the selecting is based on a similar viewing history as a viewing history of the local digital video recorder, wherein the local digital video recorder is in proximity with the controller, and wherein the remote digital video recorders are remote from the controller; and receiving the media content for presentation at the display device, wherein the media content comprises a plurality of segments, wherein the segments are provided by each one of the selected group of digital video recorders that have recorded the media content, wherein the local digital recorder generates an indicator of a recording event associated with the media content based on an identifier embedded in the media content.

8. The media processor of claim 7, wherein the identifier comprises a first segment identifier, wherein the plurality of segments are merged prior to presentation by the controller according to the first segment identifier, and wherein operations further comprise merging the plurality of segments.

9. The media processor of claim 7, wherein operations further comprise designating the plurality of segments for the media content.

10. The media processor of claim 7, wherein the segments are merged prior to receipt by the controller using a media server.

11. The media processor of claim 7, wherein the local digital video recorder is identified based on the identifier.

12. The media processor of claim 7, wherein operations further comprise receiving the segments directly from the remote digital video recorders.

13. The media processor of claim 7, wherein the remote digital video recorders provide the segments using background intelligence transfer protocol, and
wherein a number of the remote digital video recorders are selected based on network traffic conditions.

14. A method, comprising:
receiving, by a system comprising a processor, a request at a server for media content to be delivered to a media processor, the media content having finished being broadcast;

monitoring, by the system, historical information associated with a group of digital video recorders;

selecting a plurality of remote digital video recorders based on the historical information of the group of digital video recorders as a selected group of digital video recorders;

determining, by the system, at the server, a plurality of second digital video recorders that have recorded the media content from the selected group of digital video recorders, the second digital video recorders being remote from the media processor, the media content comprising a plurality of segments;

receiving, by the system, the plurality of segments from the selected group of digital video recorders and wherein a number of second digital video recorders are selected based on network traffic conditions as received segments;

merging, by the system, the received segments according to a segment identifier as merged segments; and transmitting, by the system, the merged segments from the server to the media processor for presentation of the media content.

15. The method of claim 14, comprising designating, by the system, the media content into the segments after receipt of the request for the media content.

16. The method of claim 14, wherein the historical information comprises a type of media content recorded at a local digital video recorder, wherein the local digital video recorder is associated with the media processor.

17. The method of claim 14, wherein the historical information comprises a frequency of recording a same type of media content at a local digital video recorder, wherein the local digital video recorder is associated with the media processor.

18. The method of claim 14, comprising receiving, by the system, the segments from each of the second digital video recorders using background intelligence transfer protocol.

19. The method of claim 14, wherein the request for the media content is based on a selection made at an electronic program guide.

20. The method of claim 15, wherein the historical information comprises a probability that the group of digital video recorders contains programming that will be requested by the media processor.

* * * * *